Oct. 6, 1970     S. W. NILSSON     3,532,004
BALL NUT MECHANISM
Filed Nov. 8, 1968     3 Sheets-Sheet 1
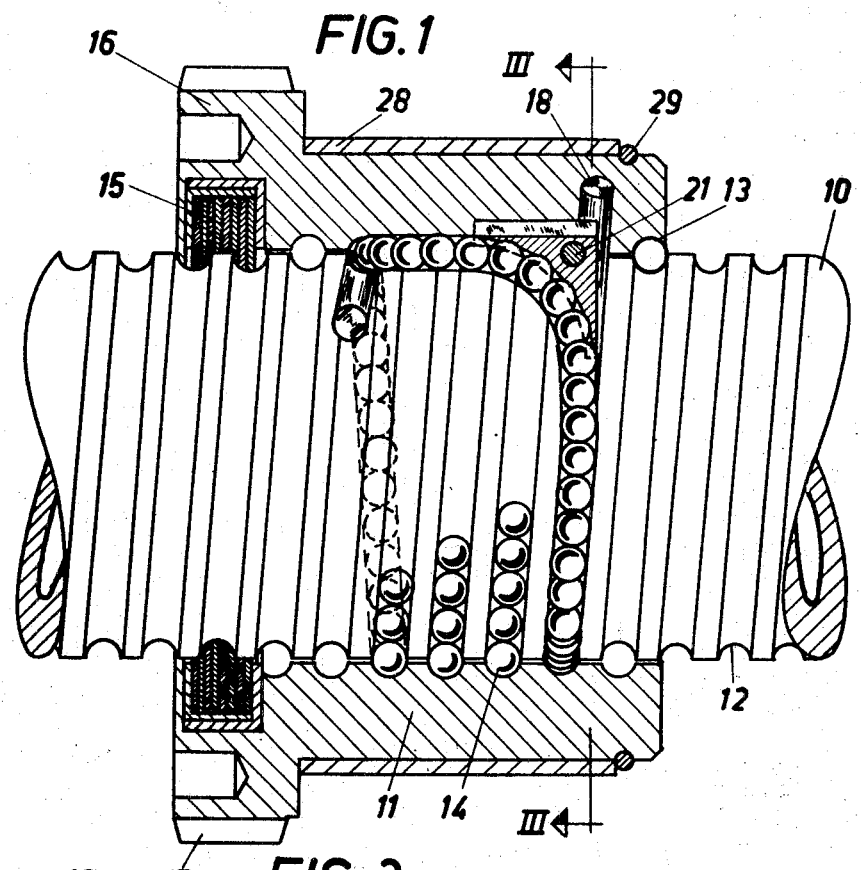
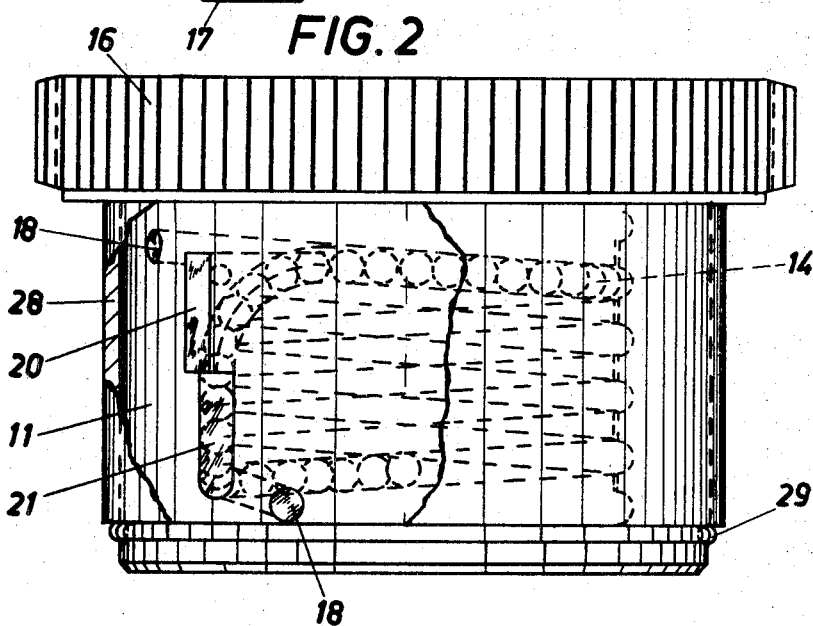
Inventor:-
Sven Walter Nilsson.
By: Howson & Howson
Attorneys.

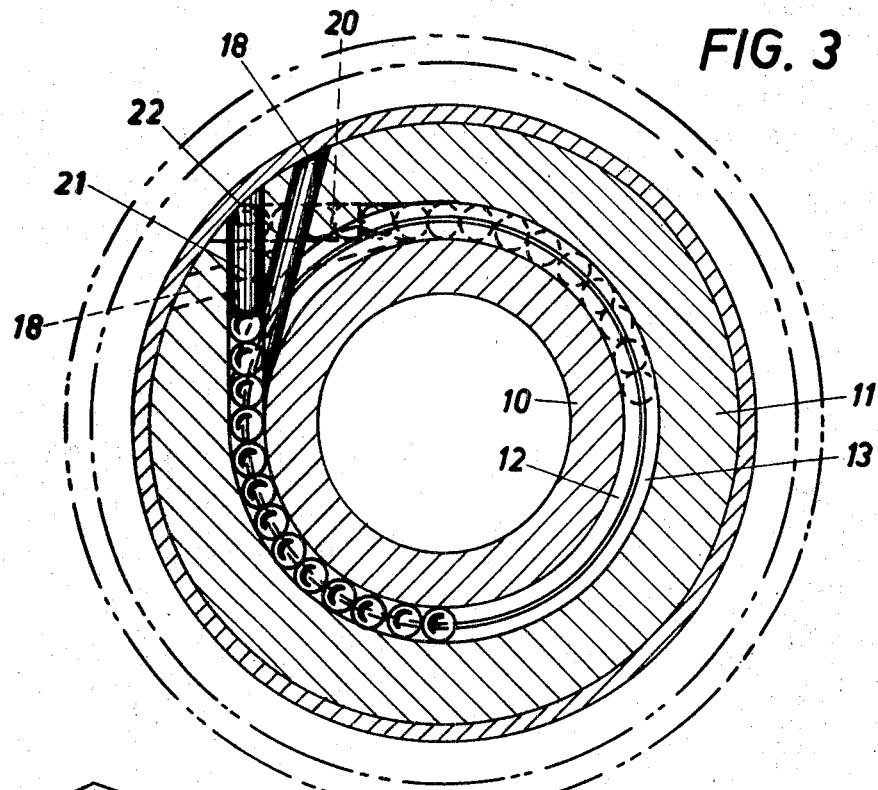
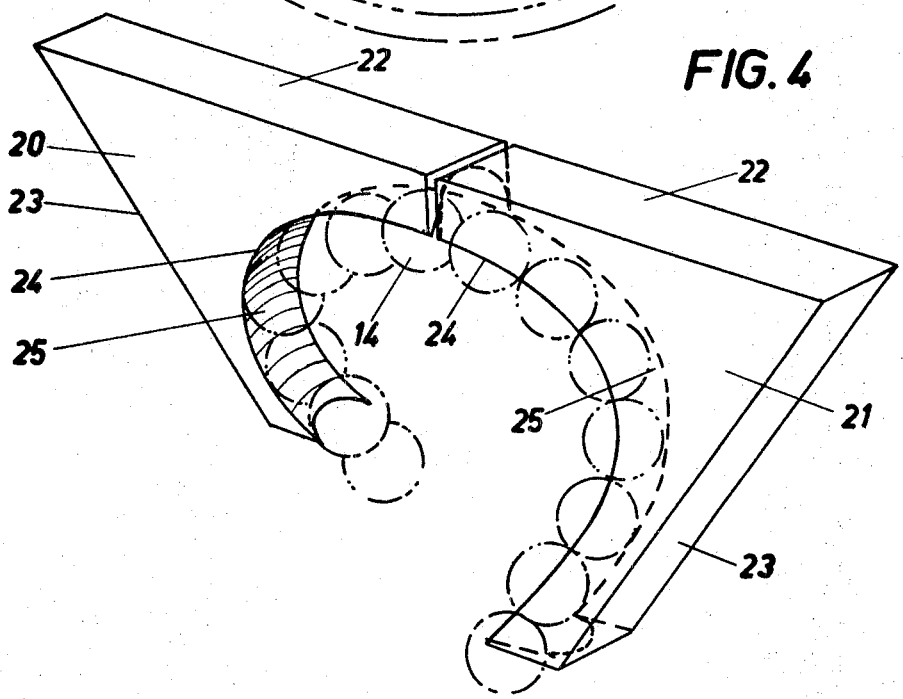

Oct. 6, 1970   S. W. NILSSON   3,532,004
BALL NUT MECHANISM
Filed Nov. 8, 1968   3 Sheets-Sheet 3

Inventor:-
Sven Walter Nilsson,
By: Dawson & Dawson,
Attorneys.

3,532,004
BALL NUT MECHANISM
Sven Walter Nilsson, Savedalen, Sweden, assignor to Aktiebolaget Svenska Kullagerfabriken, Goteborg, Sweden, a corporation of Sweden
Filed Nov. 8, 1968, Ser. No. 774,419
Claims priority, application Sweden, Nov. 13, 1967, 15,493/67
Int. Cl. F16h 55/22, 1/18
U.S. Cl. 74—459     1 Claim

ABSTRACT OF THE DISCLOSURE

The recirculation of the balls in a ball nut mechanism is a problem which has led to many complicated designs. In order to obtain a smooth flow of the balls the curves in the path followed by the balls must have a sufficient radius, and to facilitate machining and mounting the recirculation pathway should run in a generally axial direction. This is obtained by the provision of a ball governing member fitted into a recess in the nut body and having an inlet part and an outlet part essentially of triangular shape.

BACKGROUND OF THE INVENTION

The present invention refers to a ball nut mechanism of simple design, which is well adapted for manufacturing in standardized sizes to give a designer full freedom to utilize the same for inclusion in machineries of arbitrary design.

A ball nut mechanism consists basically of a screw and a nut body, each having a threaded groove, together forming a helical pathway for a number of balls, as well as some kind of means for recirculating the balls from one end of the nut body to the other. This means usually contains a deflection finger at each end of the nut extending tangentially into a groove at the juxtaposed portion of the screw.

The recirculation of the balls has proven a considerable difficulty which has made ball nut mechanisms of hitherto known design expensive to manufacture, or has necessitated parts located at portions of the nut where the strains are most noticeable, or even outside the body of the nut.

A noticeable disadvantage of the known designs has also been the sharp bends in the recirculation passage, which has a retarding influence on the balls and which also means that at least part of the passage in the nut has contained oblique or bent portions, which are difficult to machine.

SUMMARY OF THE INVENTION

One aim of the invention is to design the components of the ball nut mechanism in such a manner that the recirculation of the balls will occur smoothly, and also that the working of the components will be simplified. Other advantages will be evident from the following description.

The invention is characterized by a ball governing member composed of an inlet guide part and an outlet guide part, each being of general triangular shape with two sides essentially perpendicular to each other and a third curved side connecting the ends of the other sides, said guide parts, being located in a passage in the nut and arranged in intersecting planes being tangents to the passageway, with one end of its curved side at the point of the pertaining deflecting finger and with the opposite end thereof turned towards the juxtaposed end of the other guide part in the axial direction of the nut, said curved sides forming parts of the recirculating passage in which each curved side has an extension to pass over at least two threaded grooves.

BRIEF DESCRIPTION OF THE DRAWINGS

FIG. 1 shows a cross section through a nut together with the pertaining parts of the mechanism.

FIG. 2 shows an elevation of the nut of the mechanism as seen at right angles to the recirculation passage side.

FIG. 3 shows a cross section through the mechanism along line III—III of FIG. 1.

FIG. 4 schematically shows the guide parts of the ball governing member.

DESCRIPTION OF THE PREFERRED EMBODIMENT

Figure 5:
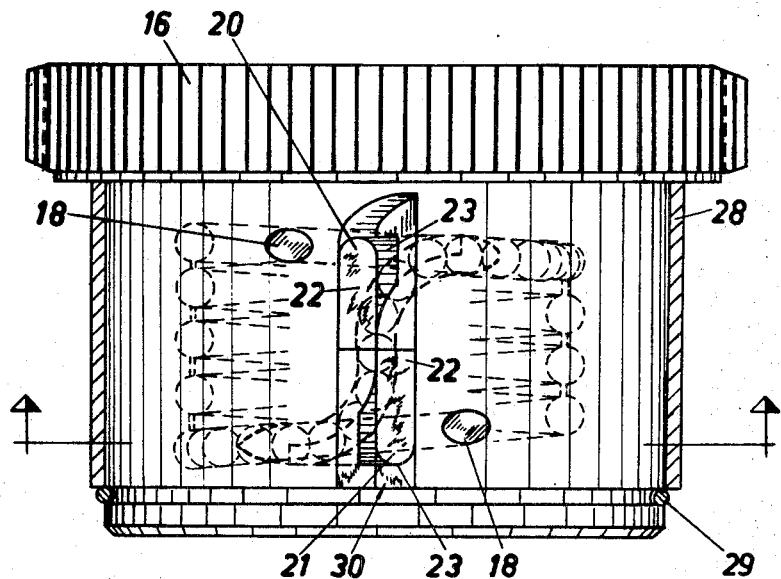
FIG. 5 shows a view of the nut of FIG. 2, seen at right angles hereto

The shaft 10 is made from a tubular member, whereby the mechanism in an easy manner may be fitted to other components in a machinery. A generally cylindrical nut body 11 is fitted on the shaft. The latter is provided with an external helical groove 12 with semicircular cross section and the nut body with a corresponding internal helical groove 13. These grooves together form a helical pathway for a number of balls 14. The balls are locked within the nut and are recirculated from one end of the nut to the other by way of an axial passage in the nut body. This passage contains a ball governing member, the design of which forms the object of the present invention and which will be explained in detail below.

Figure 6:
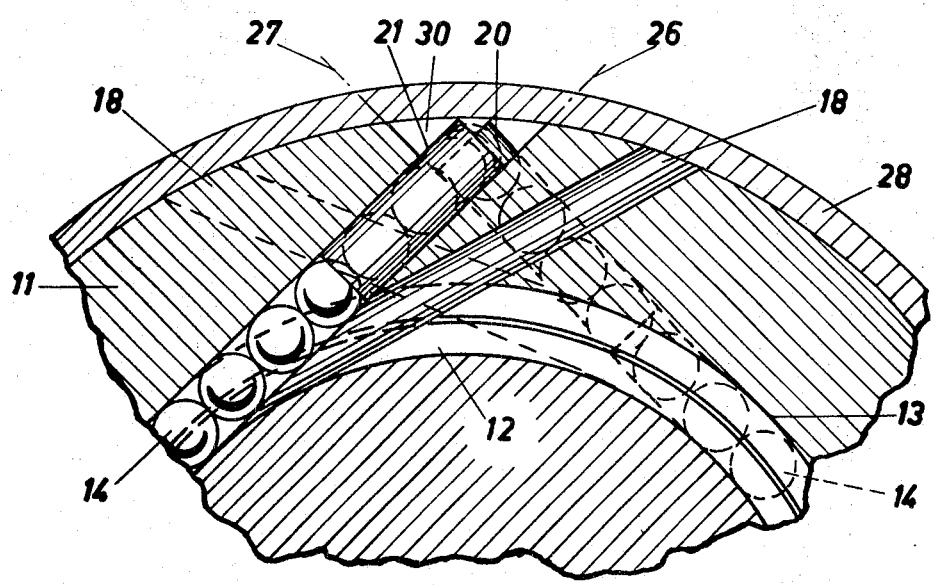
FIG. 6 shows part of FIG. 3 on a larger scale.

The nut body is provided with an internal annular recess which contains a sealing and cleaning member 15 as well as an external flange 16. On many occasions two nuts are interconnected to carry the load imposed on the mechanism. The periphery of the flange is provided with teeth 17 like a gear wheel. In mounted position the flanges of two nuts will be located at opposite ends of the combined nut and are interconnected through a screw mechanism by means of which the two nuts may be adjusted in relation to each other and retained in desired position. During operation it will be necessary continuously to recirculate the balls 14 from one end of the nut to the other. To that end an axial passage is provided in the nut body and a deflection finger 18 is fitted to each end of the nut. This finger is, as is best seen in FIG. 6, provided with an oblique end face 19 and it is directed tangentially in respect to the groove 12 in the shaft and reaches to the bottom thereof.

Depending on the direction of rotation one finger will act as a pick up and force the balls away from the helical pathway into the axial passage in the nut, while the other finger aids in bringing the balls back into the helical pathway.

The essential element for bringing about a smooth recirculation of the balls is a ball governing member, which is fitted into the ends of the passage in the nut.

This member is composed of two mutually like parts 20 and 21 the shape and function of which schematically is illustrated in FIG. 4. Depending of the direction of rotation one part will serve as inlet guide and the other as outlet guide for the balls.

Each part has a generally triangular shape, with two sides 22 and 23 mainly perpendicular to each other and with a third, curved side 24 interconnecting the ends of the two first-mentioned sides.

The third side 24 is provided with a groove 25 of the same shape as the ones in the shaft end in the nut, respectively. When fitted into suitable recesses in the nut body grooves 25 of the two guide parts together with the opposite wall or the recesses will form a runway for the balls.

As is best shown in FIG. 6 the guide parts are located in intersecting planes 26 and 27, respectively, which form tangents to the helical runway 25 for the balls.

The free ends of the straight sides 23 will be located in close vicinity to the tips of the fingers 18 to receive the balls deflected thereby. The other two straight sides are directed towards each other end located in the axial direction of the nut body in such a manner that the balls will be transferred from one guide part to the other.

One essential feature for obtaining a smooth flow of the balls is that the curved side 24 of each guide part has such an extension that it reaches across at least two grooves in the helical pathway. In this manner the radius of the curve along which the balls have to pass will be sufficiently big in relation to the ball diameter to direct the balls properly.

In FIG. 4 the guide parts are shown as directly contacting each other. With long nuts the ends of the guide parts may be axially spaced. In such a case the passage in the nut is formed to transfer the balls between the parts.

The guide parts are as mentioned above of a general triangular shape. Due to the fact that they are arranged tangentially in respect of the screw the axial sides 22 will not be perpendicular to the plane of the side faces of the guide part. FIG. 3 clearly shows how axial side 22 is machined to follow the contour of the envelope surface of the nut body.

The axial sides of the parts must not necessarily be machined to fill the recess in the nut body, and in order to better illustrate the location of the parts. FIG. 6 shows the shape of guide parts having axial sides perpendicular to the side faces.

It may also be pointed out that the shape of the radial side 23 is in fact not plane but semicircular to fit into the bore later to be described. The curved form of radial side 23 is clearly shown in FIG. 5.

The necessary passage in the nut is formed by simple machining operations. As is best seen in FIG. 6 a bore is needed for each finger 18 in a tangential direction towards the pathway. FIGS. 5 and 6 show how a recess of triangular cross section is milled from one end of the nut towards the flange 16. A bore is made near each end of the recess tangentially downwards at a different angle from that of the bore for the nearby finger 18 in such a manner that the two bores will meet. As indicated by dashed lines in FIG. 6 the bores at opposite ends of the nut are of course directed in opposite directions in relation to a vertical middle plane through the nut. The bores for the guide parts are then machined to accommodate the respective part, and care is thereby taken to form the surface which is to be opposite to the curved side 24 as a groove with semicircular cross section.

The recess is open outwards and the guide parts 20, 21 as well as the fingers 18 are retained in position by means of a sleeve 28 fitted on the outside of the nut. The sleeve is locked by means of ring 29 engaging a groove in the nut body.

What I claim is:

1. In a ball nut mechanism comprising a screw and a nut having cooperating threaded grooves forming a helical pathway for a number of balls and means for recirculating the balls from one end of the nut to the other, said means comprising a deflection finger at each end of the nut extending tangentially into the groove at the juxtaposed portion of the screw,
    a ball governing member composed of an inlet guide part and an outlet guide part, each being of general triangular shape with two sides essentially perpendicular to each other and a third, curved side connecting the ends of the other sides and having an extension corresponding to the breadth of at least two threads of the groove,
    a recess in the nut body having portions adapted to accommodate the guide parts and to locate the same in intersecting planes being tangents to the passage way with one end of each curve side at the point of the pertaining deflection finger and with the opposite end thereof turned towards the juxtaposed end of the other guide part in the axial direction of the nut whereby the recirculation passage will be formed by the curved sides of the guide parts and the juxtaposed faces of the recess.

References Cited

UNITED STATES PATENTS

| | | | |
|---|---|---|---|
| 2,959,978 | 11/1960 | Boutwell | 74—459 |
| 3,141,349 | 7/1964 | McDonald | 74—441 |
| 3,372,605 | 3/1968 | Orner | 74—459 |

LEONARD H. GERIN, Primary Examiner